United States Patent
Chu et al.

(10) Patent No.: US 9,830,181 B2
(45) Date of Patent: Nov. 28, 2017

(54) METHOD AND SYSTEM FOR GRACEFULLY SHUTDOWN VIRTUAL SYSTEM

(71) Applicant: ZTE Corporation, Shenzhen, Guangdong (CN)

(72) Inventors: Junsheng Chu, Shenzhen (CN); Yu Meng, Shenzhen (CN)

(73) Assignee: XI'AN ZHONGXING NEW SOFTWARE CO. LTD., Xi'An (CN)

( * ) Notice: Subject to any disclaimer, the term of this patent is extended or adjusted under 35 U.S.C. 154(b) by 109 days.

(21) Appl. No.: 14/410,623

(22) PCT Filed: Apr. 15, 2013

(86) PCT No.: PCT/CN2013/074219
§ 371 (c)(1),
(2) Date: Dec. 23, 2014

(87) PCT Pub. No.: WO2014/000497
PCT Pub. Date: Jan. 3, 2014

(65) Prior Publication Data
US 2015/0193251 A1      Jul. 9, 2015

(30) Foreign Application Priority Data

Jun. 26, 2012   (CN) .......................... 2012 1 0213049

(51) Int. Cl.
*G06F 9/455* (2006.01)
*G06F 1/32* (2006.01)
*G06F 9/48* (2006.01)

(52) U.S. Cl.
CPC ........ *G06F 9/45558* (2013.01); *G06F 1/3246* (2013.01); *G06F 9/485* (2013.01); *G06F 2009/45575* (2013.01)

(58) Field of Classification Search
None
See application file for complete search history.

(56) References Cited

U.S. PATENT DOCUMENTS 8,438,563 B2     5/2013   Yamaguchi
8,607,009 B2 *  12/2013   Nicholas ............... G06F 9/4418
                                                                  711/162

(Continued)

FOREIGN PATENT DOCUMENTS

CN      101206582 A      6/2008
CN      101227325 A      7/2008

(Continued)

OTHER PUBLICATIONS

International Search Report in international application No. PCT/CN2013/074219, dated Jul. 18, 2013.

(Continued)

*Primary Examiner* — Umut Onat
(74) *Attorney, Agent, or Firm* — Oppedahl Patent Law Firm LLC (57) ABSTRACT

A method for gracefully shutdown a virtual system is disclosed, and the method includes: gracefully shutdown configuration information configured for the virtual system is received and stored; and sequential shutting down of virtual machines is performed according to the stored gracefully shutdown configuration information when a request for shutting down the virtual system is received, so as to solve problems caused by the fact that virtual machines are shut down according completely to a reverse order of starting-up in the prior art.

9 Claims, 5 Drawing Sheets

(56) References Cited

U.S. PATENT DOCUMENTS

| | | |
|---|---|---|
| 2004/0199599 A1 | 10/2004 | Nichols |
| 2005/0278700 A1 | 12/2005 | Buskens |
| 2009/0249334 A1 | 10/2009 | Yamaguchi |
| 2009/0249354 A1 | 10/2009 | Yamaguchi |
| 2010/0325628 A1 | 12/2010 | Haga |
| 2011/0246813 A1* | 10/2011 | Collier ................ G06F 11/2035 714/3 |

FOREIGN PATENT DOCUMENTS

| | | |
|---|---|---|
| CN | 101951411 A | 1/2011 |
| CN | 101960464 A | 1/2011 |
| JP | 2009037271 A | 2/2009 |

OTHER PUBLICATIONS

English Translation of the Written Opinion of the International Search Authority in international application No. PCT/CN2013/074219, dated Jul. 18, 2013.

Supplementary European Search Report in European application No. 13810573.9, dated Jun. 12, 2015.

* cited by examiner

METHOD AND SYSTEM FOR GRACEFULLY SHUTDOWN VIRTUAL SYSTEM

TECHNICAL FIELD

The present disclosure relates to the field of virtualization technology, and in particular to a method and system for gracefully shutdown a virtual system.

BACKGROUND

The virtualization technology refers to a technology by which in a physical server physical resources are divided into multiple logical partitions through a hypervisor and respective logical partitions are isolated as independent virtual machines. Multiple virtual machines share resources of a same physical server. For an operation system and applications, there are no differences between the virtual machines and the physical server.

In a data center and a cloud computing environment, an application server, its front end and a database are typically deployed on different virtual machines, and all the virtual machines constitute a virtual system. Virtual machines in the virtual system are deployed with different software so as to form different functional nodes. For example, the front end of the application server is configured to implement service access functionality, the application server is configured to process service requests from users and the database is configured to store information relative to users and services. Due to certain dependency existing between different functional nodes, when a virtual system is deployed on a cloud computing platform, it is desired to provide a functionality of starting-up and shutting down the virtual machines in a certain order according to roles of virtual machines.

Figure 1:
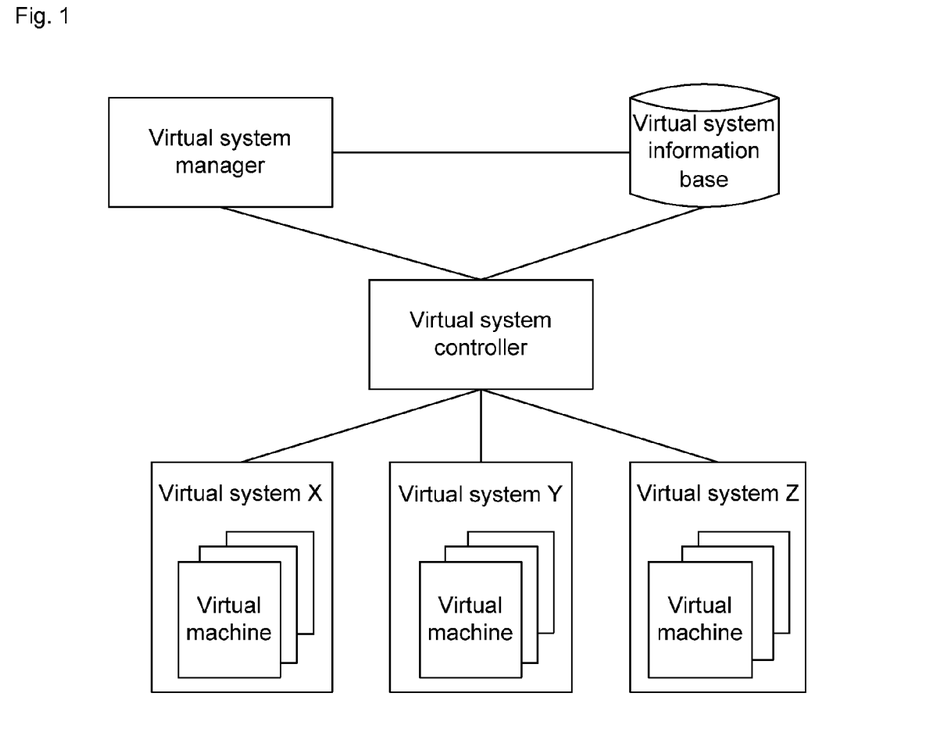
FIG. 1 is a schematic diagram of a management architecture of a virtual system in a cloud computing platform according to the prior art.

FIG. 1 is a schematic diagram of a management architecture of a virtual system in a cloud computing platform according to the prior art. As shown in FIG. 1, a virtual system manager is in charge of related life cycle management such as the establishment, modification and deletion of a virtual system, the related life cycle management includes management of virtual system information, and the virtual system manager is also in charge of updating the virtual system information into a virtual system information base; the virtual system information base is configured to record the virtual system information including related information of virtual machines in the virtual system; a virtual system controller controls the starting-up, operation and shutting down of a virtual system according to the virtual system information stored in the virtual system information base; and the virtual system is consisted of a set of virtual machines.

In an existing cloud computing platform, a process of starting-up and gracefully shutdown of a virtual system includes: a sequential number is set to each virtual machine of in the virtual system, and when starting up the virtual system, corresponding virtual machines are started up successively in ascending order in according with sequential numbers of the virtual machines and virtual machines having a same sequential number are simultaneously started up; when shutting down the virtual system, corresponding virtual machines are shut down successively in descending order in accordance with the sequential numbers of the virtual machines and virtual machines having a same sequential number are simultaneously shut down.

A traditional application server is hosted to a cloud computing platform in a way of a virtual system, and virtual machines in the virtual system serve as different functional nodes depending on service applications loaded thereon. There are different dependencies between different service applications, and starting-up of a service application needs to follow a certain order, i.e., a depended service application needs to be started up firstly, then a dependent service application can be started up. Therefore, it is desired to start up, according to a certain order, a virtual machine having service applications loaded thereon. When shutting down the virtual system, a traditional way is followed that shuts down virtual machines in a reverse order of starting-up, i.e., a dependent service application is shut down firstly, then a depended service application can be shut down. But for a large application server, dependencies between service applications are complicated, and dependencies of some service applications at their starting up may even change when the service application are to be smoothly shut down, therefore, existing mechanism cannot meet a need of a large application server.

SUMMARY

The present disclosure intends to provide a method and system for gracefully shutdown a virtual system, capable of solving problems caused by the fact that virtual machines are shut down according completely to a reverse order of starting-up in the prior art.

To this end, the technical solutions of embodiments of the present disclosure are implemented as follows.

The present disclosure provides a method for gracefully shutdown a virtual system, including receiving gracefully shutdown configuration information configured for the virtual system and storing the gracefully shutdown configuration information, and the method may further include:

sequential shutting down of virtual machines is performed according to the stored gracefully shutdown configuration information when a request for shutting down the virtual system is received.

In the above method, the step of receiving gracefully shutdown configuration information configured for the virtual system and storing the gracefully shutdown configuration information, may include:

after completing establishment of the virtual system, a virtual system manager receives the gracefully shutdown configuration information configured by a user for the virtual system according to dependency between service applications;

the virtual system manager writes the gracefully shutdown configuration information configured for the virtual system into a virtual system information base, and the virtual system information base stores the gracefully shutdown configuration information.

In the above method, the virtual system may include a set of virtual machines;

the gracefully shutdown configuration information may include a gracefully shutdown sequential number of each virtual machine in the virtual system.

In the above method, the gracefully shutdown sequential number is a non-negative integer;

the gracefully shutdown configuration information may further include: stop delay indication information and/or wait-for-stop indication information and/or stop action information.

In the above method, the step of performing sequential shutting down of virtual machines according to the stored gracefully shutdown configuration information when a request for shutting down the virtual system is received, may include:

when receiving the request for shutting down the virtual system, the virtual system manager transmits the request for shutting down the virtual system to a virtual system controller;

the virtual system controller acquires from the virtual system information base the gracefully shutdown configuration information of the virtual system; and the virtual system controller performs the sequential shutting down of the virtual machines in accordance with gracefully shutdown sequential numbers corresponding to the virtual machines according to the acquired gracefully shutdown configuration information.

In the above method, the performing the step of sequential shutting down of the virtual machines in accordance with gracefully shutdown sequential numbers corresponding to the virtual machines, may include:

the sequential shutting down of the virtual machines is performed in ascending order in accordance with the gracefully shutdown sequential numbers;

or, the sequential shutting down of the virtual machines is performed in descending order in accordance with the gracefully shutdown sequential numbers.

In the above method, the method may include:

the virtual system controller shuts down simultaneously virtual machines having a same gracefully shutdown sequential number.

In the above method, the method may include:

when the gracefully shutdown configuration information includes stop delay indication information and/or wait-for-stop indication information and/or shutting down action information, the virtual system controller performs sequential shutting down operations of the virtual machines and controls the gracefully shutdown of the virtual machines of the virtual system according to the stop delay indication information and/or the wait-for-stop indication information and/or the shutting down action information.

In the above method, the stop delay indication information may indicate time taken waiting for virtual machines corresponding to a next gracefully shutdown sequential number to be shut down after completion of gracefully shutdown of all virtual machines corresponding to one gracefully shutdown sequential number;

the wait-for-stop indication information may indicate that subsequent virtual machines are shut down after a shutting down completion indication message of previous virtual machines is received; and the shutting down action information may include controlling the virtual machines to enter into a dormant state, shutdown of the virtual machines or shutting down the virtual machines.

The present disclosure further provides a system for gracefully shutdown a virtual system, including a virtual system manager, a virtual system information base and a virtual system controller, wherein the virtual system manager is configured to receive gracefully shutdown configuration information configured for the virtual system and store the gracefully shutdown configuration information into the virtual system information base;

the virtual system information base is configured to store the gracefully shutdown configuration information; and the virtual system controller is configured to, when receiving a request for shutting down the virtual system, perform sequential shutting down of virtual machines according to the gracefully shutdown configuration information stored in the virtual system information base.

In the method and system for gracefully shutdown a system provided by embodiments of the present disclosure, gracefully shutdown configuration information configured for the virtual system is received and stored; and sequential shutting down of virtual machines is performed according to the stored gracefully shutdown configuration information when a request for shutting down the virtual system is received, thus the gracefully shutdown of virtual machines in a virtual system can be implemented; in addition, for a large application server, problems can be solved that caused by the fact that virtual machines are shut down according completely to a reverse order of starting-up in the prior art, thereby implementing flexible configuration of the order of gracefully shutdown.

DETAILED DESCRIPTION

Basic ideas of embodiments of the present disclosure lie in: gracefully shutdown configuration information configured for the virtual system is received and stored; and sequential shutting down of virtual machines is performed according to the stored gracefully shutdown configuration information when a request for shutting down the virtual system is received.

Embodiments of the present disclosure will be further elaborated below through accompanying drawings and specific embodiments.

Figure 2:
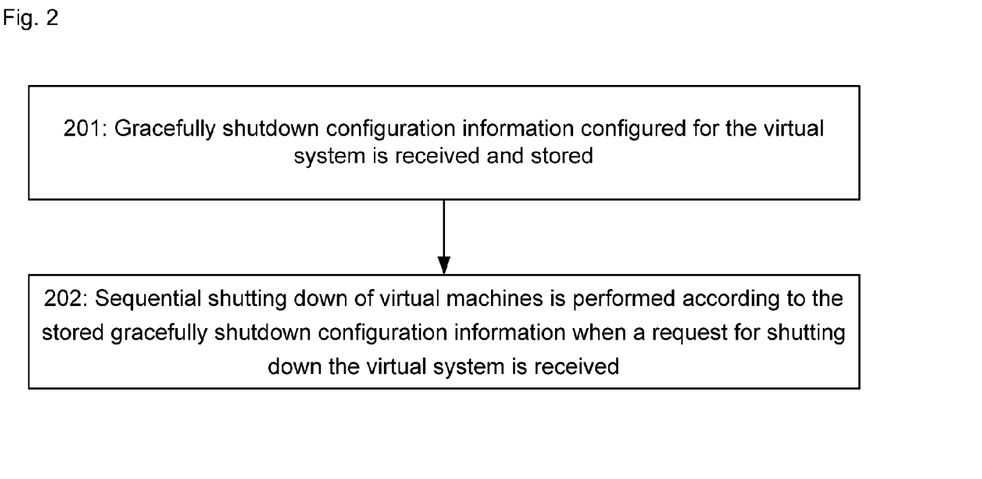
FIG. 2 is a schematic flow chart for implementing a method for gracefully shutdown a virtual system according to an embodiment of the present disclosure.
Figure 3:
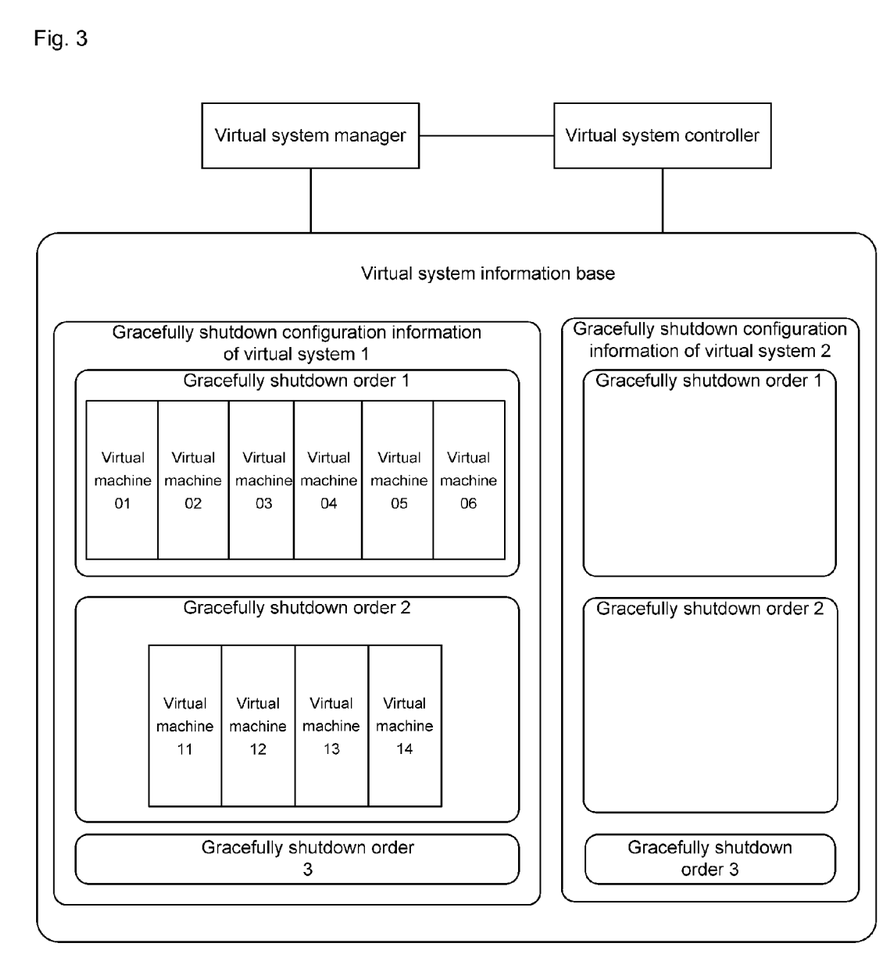
FIG. 3 is a schematic diagram of a management architecture of a virtual system in a cloud computing platform according to an embodiment of the present disclosure.

Embodiments of the present disclosure provide a method for gracefully shutdown a virtual system, FIG. 2 is a schematic flow chart for implementing the method for gracefully shutdown a virtual system, as shown in FIG. 2, the method includes the following steps:

Step 201, gracefully shutdown configuration information configured for the virtual system is received and stored;

Specifically, in a cloud computing platform, a virtual system manager receives a request for establishing a virtual system and may receive, after completing establishment of the virtual system, gracefully shutdown configuration information configured for the virtual system by a user through a client according to dependencies between service applications; FIG. 3 is s a schematic diagram of a management architecture of a virtual system in a cloud computing platform according to an embodiment of the present disclosure, as shown in FIG. 3, the virtual system manager writes into a virtual system information base the gracefully shutdown configuration information configured for the virtual system by the user, and the gracefully shutdown configuration information is stored in the virtual system information base.

As shown in FIG. 3, each virtual system may be configured with gracefully shutdown configuration information corresponding to the virtual system, and gracefully shutdown configuration information of multiple virtual systems may be stored in the virtual system information base; each virtual system includes a set of virtual machines, wherein the gracefully shutdown configuration information includes a gracefully shutdown sequential number corresponding to each virtual machines in the virtual system, the gracefully shutdown sequential number is a non-negative integer, and the gracefully shutdown sequential number may be or not be the same as a number of a starting-up order; optionally, the gracefully shutdown configuration information may further include stop delay indication information and/or wait-for-stop indication information and/or shutting down action information and the like.

step 202, sequential shutting down of virtual machines is performed according to the stored gracefully shutdown configuration information when a request for shutting down the virtual system is received;

Specifically, as shown in FIG. 3, when receiving a request for shutting down the virtual system transmitted by the user through the client, the virtual system manager sends to a virtual system controller in the cloud computing platform the request for shutting down the virtual system, carrying a number of a virtual system requested to be shut down;

After receiving the request for shutting down the virtual system transmitted by the virtual system manager, according to the number of the virtual system therein, the virtual system controller acquires, from the virtual system information base, gracefully shutdown configuration information corresponding to the number of the virtual system; the virtual system controller performs sequential shutting down of virtual machines according to the acquired gracefully shutdown configuration information, i.e., in accordance with gracefully shutdown sequential numbers corresponding to the virtual machines; wherein the sequential shutting down of virtual machines may be performed in ascending order in accordance with the gracefully shutdown sequential numbers, or the sequential shutting down of virtual machines may also be performed in descending order in accordance with the gracefully shutdown sequential numbers; wherein virtual machines having a same gracefully shutdown sequential number may be simultaneously shut down.

The gracefully shutdown configuration information may further include stop delay indication information and/or wait-for-stop indication information and/or shutting down action information; when performing sequential shutting down of virtual machines, the virtual system controller may also control the gracefully shutdown of virtual machines in the virtual system according to the stop delay indication information and/or the wait-for-stop indication information and/or the shutting down action information configured for the virtual system, for example, when virtual machines in the virtual system are configured with the stop delay indication information, the stop delay indication information indicates time taken waiting for virtual machines corresponding to a next gracefully shutdown sequential number to be shut down after completion of gracefully shutdown of all virtual machines corresponding to one gracefully shutdown sequential number, and the virtual system controller will shut down virtual machines corresponding to the next gracefully shutdown sequential number after a stop-delay timer expires; when virtual machines in the virtual system are configured with the wait-for-stop indication information, the wait-for-stop indication information indicates that subsequent virtual machines are shut down after a shutting down completion indication message of previous virtual machines is received; and when virtual machines in the virtual system are configured with the shutting down action information, the shutting down action information includes controlling the virtual machines to enter into a dormant state, shutdown of the virtual machines or shutting down the virtual machines, the shutdown of virtual machines refers to soft shutdown of the virtual machines, i.e., shutting down safely a user operation system, while the shutting down the virtual machines refers to hard shutting down of the virtual machines, i.e., shutting down a user operation system, which may result in loss of user data.

The technical solution according to embodiments of the present disclosure may co-exist with the solution of shutting down virtual machines in accordance with a reverse order of starting-up in the prior art, i.e., when gracefully shutdown configuration information is configured, virtual machines in the virtual system are shut down in accordance with the gracefully shutdown configuration information, while no gracefully shutdown configuration information is configured, virtual machines in the virtual system are shut down in accordance with the reverse order of starting-up.

Embodiment 1

Figure 4:
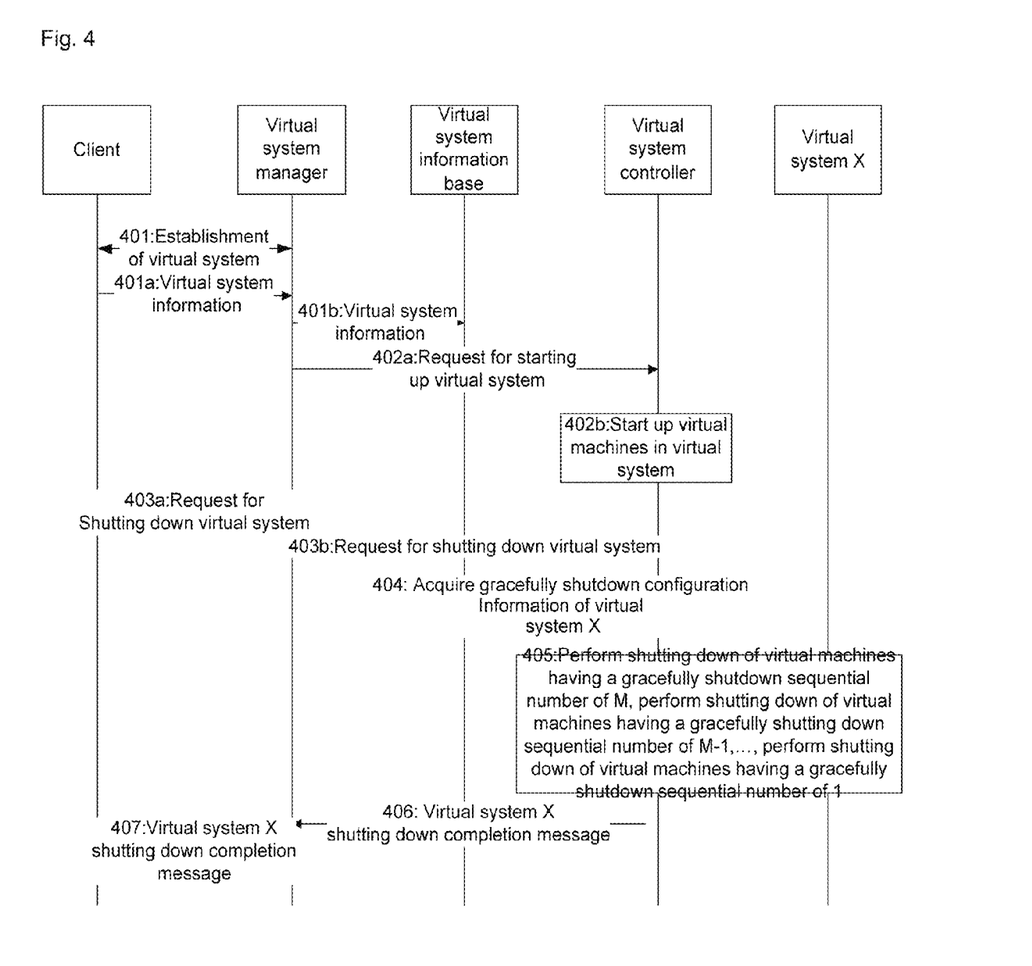
FIG. 4 is a schematic flow chart for implementing a method for gracefully shutdown a virtual system according to embodiment 1 of the present disclosure.

FIG. 4 is a schematic flow chart for implementing a method for gracefully shutdown a virtual system according to embodiment 1 of the present disclosure, as shown in FIG. 4, the method includes the following steps:

Step 401, a virtual system manager receives a request for establishing a virtual system and receives, after completing establishment of the virtual system, virtual system information configured for the virtual system, including starting-up sequential numbers of virtual machines and gracefully shutdown configuration information of the virtual machines, and the virtual system manager writes configured virtual system information into a virtual system information base.

Step 402, when receiving a request for starting up the virtual system, the virtual system manager sends the request for starting up the virtual system to a virtual system controller, and according to configured starting-up sequential numbers, the virtual system controller starts up virtual machines corresponding to respective numbers in the virtual system.

Step 403, when receiving a request for shutting down the virtual system, the virtual system manager forwards the request for shutting down the virtual system to the virtual system controller; a number of a virtual system desired to be shut down, e.g., the virtual system X in the embodiment, is carried in the request for shutting down the virtual system.

Step 404, the virtual system controller acquires, from the virtual system information base, gracefully shutdown configuration information of the virtual system X according to the number of the virtual system desired to be shut down carried in the request for shutting down the virtual system.

Step 405, according to the acquired gracefully shutdown configuration information, the virtual system controller performs shutting down of virtual machines having a gracefully shutdown sequential number of M, and after completion of shutting down all virtual machines having the gracefully shutdown sequential number of M, performs shutting down of virtual machines having a gracefully shutdown sequential number of M−1, and after completion of shutting down all virtual machines having the gracefully shutdown sequential number of M−1, performs shutting down of virtual machines having a gracefully shutdown sequential number of M−2, and so forth, and after completion of shutting down all virtual machines having a gracefully shutdown sequential number of 2, the virtual system controller performs shutting down of virtual machines having a gracefully shutdown sequential number of 1.

Step 406, after completion of sequential shutting down of all virtual machines in the virtual system M, the virtual system controller returns to the virtual system manager a virtual system X shutting down completion message.

Step 407, the virtual system manager forwards the virtual system X shutting down completion message to a client transmitting the request for shutting down the virtual system.

In the embodiment, the sequential shutting down of virtual machines in the virtual system may be performed in descending order of the gracefully shutdown sequential number, or the sequential shutting down of virtual machines in the virtual system may also be performed in ascending order of the gracefully shutdown sequential number.

Embodiment 2

Figure 5:
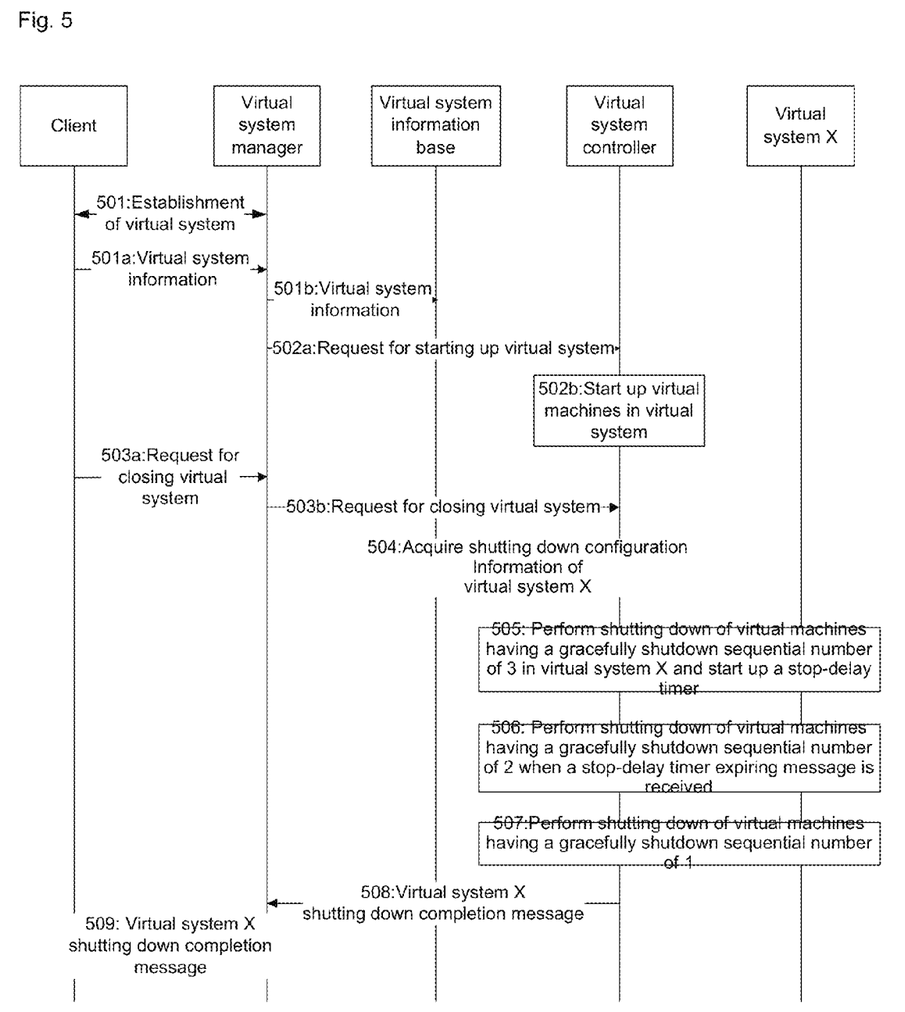
FIG. 5 is a schematic flow chart for implementing a method for gracefully shutdown a virtual system according to embodiment 2 of the present disclosure.

FIG. 5 is a schematic flow chart for implementing a method for gracefully shutdown a virtual system according to embodiment 2 of the present disclosure, i.e., a specific implementation of the method for gracefully shutdown a virtual system when virtual machines in the virtual system are configured with stop delay indication information, as shown in FIG. 5, the method includes the following steps:

Step 501, a virtual system manager receives a request for establishing a virtual system and receives, after completing establishment of the virtual system, virtual system information configured for the virtual system, including starting-up sequential numbers of virtual machines and gracefully shutdown configuration information of the virtual machines. The virtual system manager writes configured virtual system information into a virtual system information base; in the embodiment, there are 3 gracefully shutdown sequential number in the gracefully shutdown configuration information, and the gracefully shutdown configuration information further includes stop delay indication information configured for a virtual machine VM32 of the virtual system.

Step 502, when receiving a request for starting up the virtual system, the virtual system manager sends the request for starting up the virtual system to a virtual system controller, and according to configured starting-up sequential numbers, the virtual system controller starts up virtual machines corresponding to respective numbers in the virtual system.

Step 503, when receiving a request for shutting down the virtual system, the virtual system manager forwards the request for shutting down the virtual system to the virtual system controller; a number of a virtual system desired to be shut down, e.g., the virtual system X in the embodiment, is carried in the request for shutting down the virtual system.

Step 504, the virtual system controller acquires, from the virtual system information base, gracefully shutdown configuration information of the virtual system X according to the number of the virtual system desired to be shut down carried in the request for shutting down the virtual system.

Step 505, the virtual system controller performs shutting down of all virtual machines having a gracefully shutdown sequential number of 3 in the system X according to the gracefully shutdown configuration information, i.e., the virtual system controller performs simultaneously shutting down of virtual machines VM31, VM32, VM33 and VM34 having the gracefully shutdown sequential number of 3; the virtual system controller starts up a stop-delay timer according to the stop delay indication information configured for the virtual machine VM32 of the virtual system.

Step 506, after the virtual system controller completes shutting down of virtual machines VM31, VM32, VM33 and VM34, due to the stop-delay timer is operating, the virtual system controller doesn't perform shutting down of virtual machines having a gracefully shutdown sequential number of 2; after receiving a stop-delay timer expiring message, the virtual system controller will then perform shutting down of the virtual machines having the gracefully shutdown sequential number of 2.

Step 507, after completion of shutting down all virtual machines having the gracefully shutdown sequential number of 2, the virtual system controller performs shutting down of virtual machines having a gracefully shutdown sequential number of 1.

Step 508, after completion of shutting down all virtual machines having the gracefully shutdown sequential number of 1, the virtual system controller then completes sequential shutting down of all virtual machines in the virtual system X, and the virtual system controller returns to the virtual system manager a virtual system X shutting down completion message.

Step 509, the virtual system manager forwards the virtual system X shutting down completion message to a client transmitting the request for shutting down the virtual system.

Embodiment 3

Figure 6:
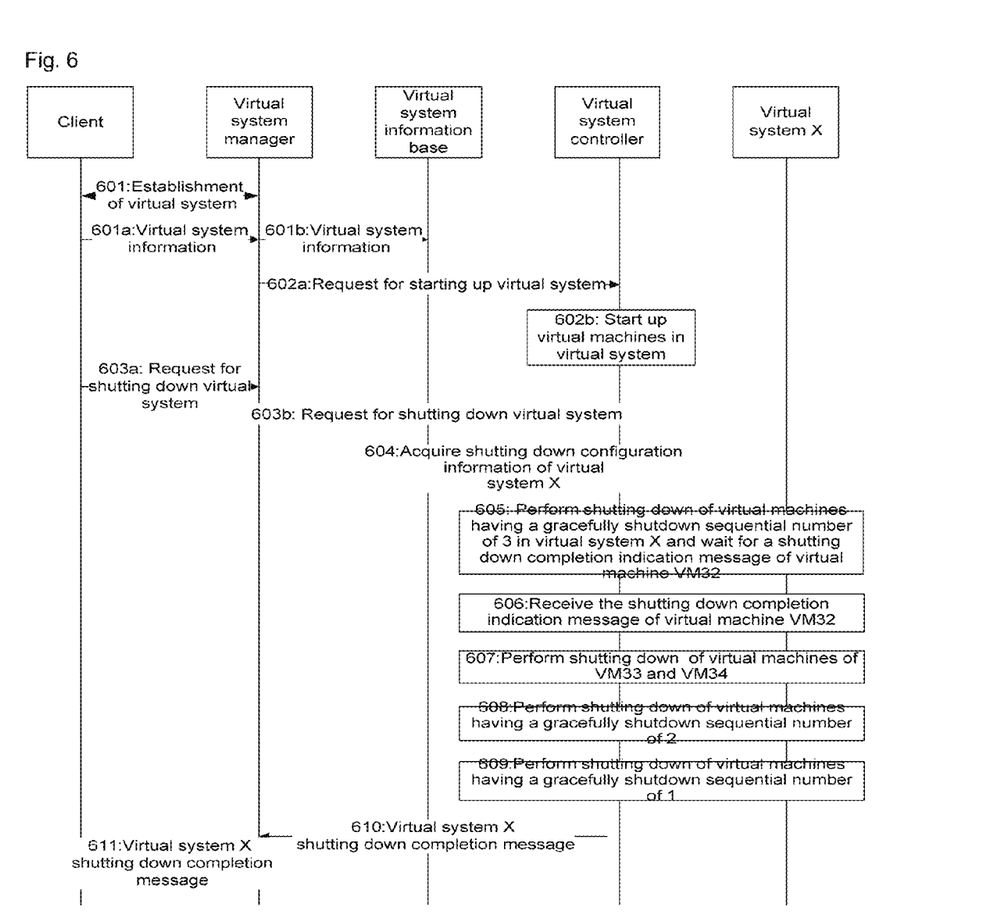
FIG. 6 is a schematic flow chart for implementing a method for gracefully shutdown a virtual system according to embodiment 3 of the present disclosure.

FIG. 6 is a schematic flow chart for implementing a method for gracefully shutdown a virtual system according to embodiment 3 of the present disclosure, i.e., a specific implementation of the method for gracefully shutdown a virtual system when virtual machines in the virtual system are configured with wait-for-stop indication information, as shown in FIG. 6, the method includes the following steps:

Step 601, a virtual system manager receives a request for establishing a virtual system and receives, after completing establishment of the virtual system, virtual system information configured for the virtual system, including starting-up sequential numbers of virtual machines and gracefully shutdown configuration information of the virtual machines. The virtual system manager writes configured virtual system information into a virtual system information base; in the embodiment, there are 3 gracefully shutdown sequential number in the gracefully shutdown configuration information, and the gracefully shutdown configuration information further includes wait-for-stop indication information configured for a virtual machine VM32 of the virtual system.

Step 602, when receiving a request for starting up the virtual system, the virtual system manager sends the request for starting up the virtual system to a virtual system controller, and according to configured starting-up sequential numbers, the virtual system controller starts up virtual machines corresponding to respective numbers in the virtual system.

Step 603, when receiving a request for shutting down the virtual system, the virtual system manager forwards the request for shutting down the virtual system to the virtual system controller; a number of a virtual system desired to be shut down, e.g., the virtual system X in the embodiment, is carried in the request for shutting down the virtual system.

Step 604, the virtual system controller acquires from the virtual system information base the gracefully shutdown configuration information of the virtual system X.

Step 605, the virtual system controller performs shutting down of all virtual machines having a gracefully shutdown sequential number of 3 in the system X according to the gracefully shutdown configuration information, i.e., the virtual system controller performs simultaneously shutting down of virtual machines VM31 and VM32 having the gracefully shutdown sequential number of 3; the virtual system controller waits for a shutting down completion indication message of the virtual machine VM32 according to the wait-for-stop indication information configured for the virtual machine VM32 of the virtual system.

Step 606, the virtual system controller receives the shutting down completion indication message of the virtual machine VM32.

Step 607, the virtual system controller performs shutting down of virtual machines VM33 and VM34.

Step 608, after completion of shutting down all virtual machines having the gracefully shutdown sequential number of 3, the virtual system controller performs shutting down of virtual machines having a gracefully shutdown sequential number of 2.

Step 609, after completion of shutting down all virtual machines having the gracefully shutdown sequential number of 2, the virtual system controller performs shutting down of virtual machines having a gracefully shutdown sequential number of 1.

Step 610, after completion of shutting down all virtual machines having the gracefully shutdown sequential number of 1, the virtual system controller then completes sequential shutting down of all virtual machines in the virtual system X, and the virtual system controller returns to the virtual system manager a virtual system X shutting down completion message.

Step 611, the virtual system manager forwards the virtual system X shutting down completion message to a client transmitting the request for shutting down the virtual system.

Figure 7:
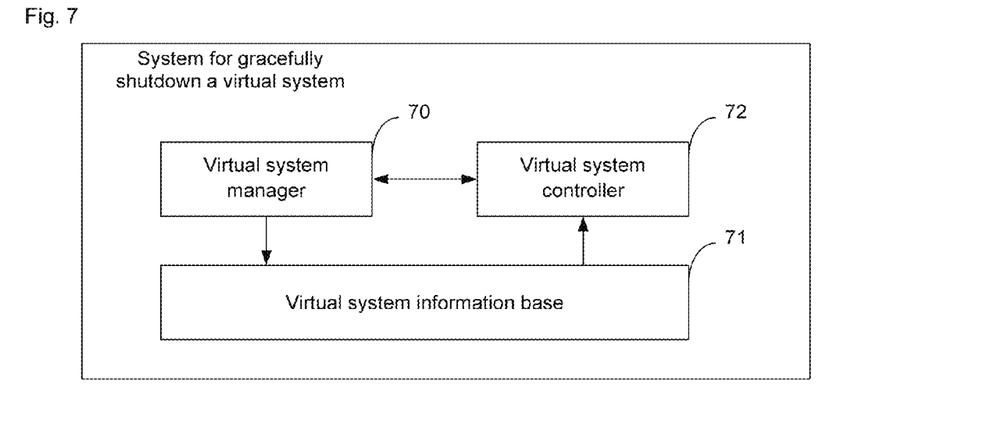
FIG. 7 is a schematic structural diagram of a system for gracefully shutdown a virtual system according to an embodiment of the present disclosure.

In order to implement above method, embodiments of the present disclosure further provides a system for gracefully shutdown a virtual system, is a schematic structural diagram of a system for gracefully shutdown a virtual system according to an embodiment of the present disclosure, as shown in FIG. 7, the system includes a virtual system manager 70, a virtual system information base 71 and a virtual system controller 72, wherein the virtual system manager 70 is configured to receive gracefully shutdown configuration information configured for the virtual system and store the gracefully shutdown configuration information into the virtual system information base 71;

the virtual system information base 71 is configured to store the gracefully shutdown configuration information; and the virtual system controller 72 is configured to, when receiving a request for shutting down the virtual system, perform sequential shutting down of virtual machines according to the gracefully shutdown configuration information stored in the virtual system information base 71.

In an embodiment, the virtual system manager 70 receiving gracefully shutdown configuration information configured for the virtual system and the virtual system information base storing the gracefully shutdown configuration information, include:

after completing establishing the virtual system, the virtual system manager 70 receives gracefully shutdown configuration information configured for the virtual system by a user according to dependencies between service applications; the virtual system manager 70 writes into the virtual system information base 71 the gracefully shutdown configuration information configured for the virtual system, and the virtual system information base 71 stores the gracefully shutdown configuration information.

The gracefully shutdown configuration information includes a gracefully shutdown sequential number corresponding to each virtual machines in the virtual system, and may also include stop delay indication information and/or wait-for-stop indication information and/or shutting down action information; when the gracefully shutdown configuration information includes the stop delay indication information and/or wait-for-stop indication information and/or shutting down action information and when the virtual system controller performs sequential shutting down of virtual machines, the sequential shutting down of virtual machines in the virtual system are controlled according simultaneously to the stop delay indication information and/or wait-for-stop indication information and/or shutting down action information.

The performing by the virtual system controller 72 sequential shutting down of virtual machines according to the stored gracefully shutdown configuration information when receiving a request for shutting down the virtual system, includes:

when receiving the request for shutting down the virtual system, the virtual system manager 70 sends the request for shutting down the virtual system to the virtual system controller 72; the virtual system controller 72 acquires from the virtual system information base 71 the smooth configuration information of the virtual system; the virtual system controller 72 performs sequential shutting down of virtual machines in accordance with corresponding gracefully shutdown sequential numbers according to the acquired gracefully shutdown configuration information.

The performing sequential shutting down of virtual machines in accordance with corresponding gracefully shutdown sequential numbers includes: the sequential shutting down of the virtual machines is performed in ascending order in accordance with the gracefully shutdown sequential numbers; or, the sequential shutting down of the virtual machines is performed in descending order in accordance with the gracefully shutdown sequential numbers.

The virtual system controller 72 shuts down simultaneously virtual machines having a same gracefully shutdown sequential number.

In embodiments of the present disclosure, the virtual system manager and the virtual system controller may be separately configured, with each of them being an independent entity, or they may be combined as one entity; furthermore, the virtual system information base and the virtual system manager and/or the virtual system controller may be combined as one entity or may be separately configured as independent entities.

What described are merely preferable embodiments of the present disclosure, and are not intended to limit the scope of protection of the present disclosure. All modifications, replacements and improvements made within the spirit and principles of the present disclosure should be included within the scope of protection of the present disclosure.

The invention claimed is:

1. A method for gracefully shutdown a virtual system, the virtual system comprising a set of virtual machines, and the method comprising:
   receiving gracefully shutdown configuration information configured for the virtual system and storing the gracefully shutdown configuration information; and
   performing sequential shutting down of virtual machines according to the stored gracefully shutdown configuration information when a request for shutting down the virtual system is received;
   wherein the step of receiving gracefully shutdown configuration information configured for the virtual system and storing the gracefully shutdown configuration information, comprises:
   after completing establishment of the virtual system, receiving, by a virtual system manager, the gracefully shutdown configuration information configured by a user for the virtual system according to dependency between service applications;
   writing, by the virtual system manager, the gracefully shutdown configuration information configured for the virtual system into a memory, and storing, by the memory, the gracefully shutdown configuration information;
   wherein the gracefully shutdown configuration information comprises at least one of: stop delay indication information, and wait-for-stop indication information;
   wherein the stop delay indication information indicates time taken waiting for virtual machines corresponding to a next gracefully shutdown sequential number to be shut down after completion of gracefully shutdown of all virtual machines corresponding to one gracefully shutdown sequential number; and
   the wait-for-stop indication information indicates that subsequent virtual machines are shut down after a shutting down completion indication message of previous virtual machines is received.

2. The method according to claim 1, wherein
   the gracefully shutdown configuration information comprises a gracefully shutdown sequential number of each virtual machine in the virtual system.

3. The method according to claim 2, wherein
   the gracefully shutdown sequential number is a non-negative integer.

4. The method according to claim 1, wherein the step of performing sequential shutting down of virtual machines according to the stored gracefully shutdown configuration information when a request for shutting down the virtual system is received, comprises:
   when receiving the request for shutting down the virtual system, transmitting, by the manager, the request for shutting down the virtual system to a controller;
   acquiring, by the virtual system controller, from the memory the gracefully shutdown configuration information of the virtual system; and
   performing, by the virtual system controller, the sequential shutting down of the virtual machines in accordance with gracefully shutdown sequential numbers corresponding to the virtual machines according to the acquired gracefully shutdown configuration information.

5. The method according to claim 4, wherein the step of performing the sequential shutting down of the virtual machines in accordance with gracefully shutdown sequential numbers corresponding to the virtual machines, comprises:
   performing the sequential shutting down of the virtual machines in ascending order in accordance with the gracefully shutdown sequential numbers;
   or, performing the sequential shutting down of the virtual machines in descending order in accordance with the gracefully shutdown sequential numbers.

6. The method according to claim 4, further comprising:
   shutting down simultaneously, by the virtual system controller, virtual machines having a same gracefully shutdown sequential number.

7. The method according to claim 4, further comprising:
   when the gracefully shutdown configuration information comprises stop delay indication information and/or wait-for-stop indication information and/or stop action information,
   performing, by the virtual system controller, sequential shutting down operations of the virtual machines, and controlling the gracefully shutdown of the virtual machines of the virtual system according to the stop delay indication information and/or the wait-for-stop indication information and/or the stop action information.

8. The method according to claim 5, further comprising:
   shutting down simultaneously, by the virtual system controller, virtual machines having a same gracefully shutdown sequential number.

9. The method according to claim 5, further comprising:
   when the gracefully shutdown configuration information comprises stop delay indication information and/or wait-for-stop indication information and/or stop action information,
   performing, by the virtual system controller, sequential shutting down operations of the virtual machines, and controlling the gracefully shutdown of the virtual machines of the virtual system according to the stop delay indication information and/or the wait-for-stop indication information and/or the stop action information.

* * * * *